United States Patent
Rhinehart

[11] Patent Number: 5,253,447
[45] Date of Patent: Oct. 19, 1993

[54] BOTTOM BOUNCER JIG FOR WALLEYES

[76] Inventor: Lavern R. Rhinehart, 408 ½- 9th Ave. NE., Mandan, N. Dak. 58554

[21] Appl. No.: 918,227

[22] Filed: Jul. 24, 1992

[51] Int. Cl.$^5$ .............................................. A01K 95/00
[52] U.S. Cl. ..................................... 43/42.74; 43/43.1; 43/44.84
[58] Field of Search ................... 43/43.1, 42.74, 44.84, 43/43.15, 44.85

[56] References Cited

U.S. PATENT DOCUMENTS

| | | | |
|---|---|---|---|
| 1,720,287 | 7/1929 | Moore | 43/42.74 |
| 2,170,788 | 8/1939 | Augenblick | 43/42.74 |
| 2,173,750 | 9/1939 | Braconi | 43/42.84 |
| 2,589,715 | 3/1952 | Lysikowski . | |
| 2,907,133 | 10/1959 | Myers | 43/43.1 |
| 3,137,962 | 6/1964 | Linley, Sr. . | |
| 3,421,250 | 1/1969 | Krieg | 43/42.74 |
| 3,461,597 | 8/1969 | Hobson . | |
| 4,161,838 | 7/1979 | Gapen . | |
| 4,428,144 | 1/1984 | Dickinson . | |
| 4,467,550 | 8/1984 | Haulk . | |
| 4,750,289 | 6/1988 | Rossa . | |
| 4,989,360 | 2/1991 | Lewis | 43/42.74 |
| 5,065,542 | 11/1991 | Lindaberry . | |

FOREIGN PATENT DOCUMENTS 10418 of 1899 United Kingdom ............... 43/44.84

Primary Examiner—Kurt C. Rowan
Attorney, Agent, or Firm—Stevens, Davis, Miller & Mosher

[57] ABSTRACT

A fishing jig having special utility in trolling or drift fishing for bottom feeding fish, such as walleye, is constructed of a metal wire or rod. The wire or rod is bent so as to form two depending legs of unequal length having a loop formed at the juncture of the legs. The shorter leg is provided with a wound eye through which the longer leg passes. One or more sinkers can be placed on the longer leg before insertion of the leg into the eye. An alternative embodiment includes the provision of a trailing arm extending from the proximity of the loop for attaching lines and/or leaders.

2 Claims, 2 Drawing Sheets

BOTTOM BOUNCER JIG FOR WALLEYES

BACKGROUND OF THE INVENTION

1. Field of the Invention

This invention relates to fishing jigs, more particularly to a fishing jig designed to carry fishing lures, leaders, and/or baits. The fishing jig is specifically designed to incorporate a fast release mechanism for releasing or reinstalling one or more sinkers thereon in a manner so as to hold the line or bait up off the bottom of the lake, stream, or river bed while trolling or drift fishing with the jig of the invention.

2. Description of the Related Art

Fishing has been practiced for millennia, both of necessity to gather food as well as for sport. While invariably fishing is accomplished with a line and a hook, refinements in the art or sport of fishing include specialized equipment, such as rods, reels, lines and jigs.

Many such specialized jigs exist for the fishing of specific species of fish, such as the trouts, basses and other species of fish. Fishing tackle has also been designed so as to more effectively for a particular type of fishing whether it be fly-fishing, trolling or bottom fishing.

The present invention is directed toward a more effective device for bottom fishing and/or trolling for such bottom feeding fish as walleye. As is well known, bottom feeding fish feed near the bottom of a body of water where rocks, sunken logs and other snags exist. Such obstacles can cause fouling of the jig or line, thus leading to a loss of one or both. Thus, there is great incentive to create a bottom fishing jig which is easier to manufacture and use than prior art devices while at the sam time minimizing the possibility that such jig will foul when bottom fishing or trolling near the bottom of a body of water.

Prior art efforts have included the provision of a weight, or sinker, on a fishing line to drag the line to the bottom of a body of water. The sinker is chosen so as to be of sufficient mass to hold the line or bait near the bottom. Depending upon rate of drift, or trolling speed, water current, wind and other conditions, such as the buoyancy of the bait or line, it may be necessary to increase number or mass of the sinkers. One such adjustable weight device is disclosed in U.S Pat. No. 3,461,597, which consists of a frame member having means for attachment to a fishing line including a weight holding elongated portion integral with the frame member at one end and having a "safety-pin" type catch at the other end whereby annular weights may be mounted on the elongated portion of the frame member. The adjustment of weight on a fishing line including the particular adjustable weight sinker of the aforementioned U.S. Pat. No. 3,461,597 are dependent on the judicious choice of the number or mass of the sinker to suit the particular current, rate of drift, and other conditions to place the bait or lure near the bottom and are not entirely satisfactory.

Other attempts of the prior art have included the presence of a depending rod downwardly extending from the fishing line so as to contact the bottom. In such a manner, it was hoped that such rod would position the bait or lure at a height above the bottom generally corresponding to the length of such rod. Such a device, as disclosed in U.S. Pat. No. 3,137,962, requires the use of a specialized sinker, made of buoyant material, or of a hollow shape so as to be buoyant, such that, the sinker will float if no movement of the jig through the water is achieved. When the jig is moved, a fin on the jig exerts a downward force causing the sinker to sink to a depth at which the free end of the rod engages the bottom. Like the use of the adjustable weight, the buoyant sinker of U.S. Pat. No. 3,137,962 is dependent on the conditions of speed of travel and thus is not entirely satisfactory for maintaining a lure or baited hook near the desired bottom feeding zone. Additionally, such specialized features as a buoyant sinker and fin increase the cost of manufacture of such jigs.

Many other attempts at providing fishing tackle utilize the idea of a depending rod as in U.S. Pat. No. 3,137,962. Such prior art devices are disclosed in U.S. Pat. Nos. 2,589,715, 4,161,838, 4,428,144, 4,467,550, 4,750,289 and 5,065,542. Each of the aforementioned U.S. Patents are expressly incorporated by reference in their entirety.

Such devices have not proved acceptable in that they are expensive to manufacture if adjustability in weight is desired. Further, unless specialized precautions are taken, loss of the weights utilized with such jigs can frequently occur.

For example, U.S. Pat. No. 4,750,289 utilizes a clip member to secure a sinker to a jig. However, such clip can readily open resulting in loss of the sinker. In order to prevent such opening of the sinker retaining clip, patentee required the use of specialized sinkers having a groove adapted to engage the clip member. Even so, patentee found it necessary to bend the depending leg upon which the sinker was carried so as to prevent loss of the sinker upon inadvertent opening of the clip during use of the jig. Such bend changes the height of the line from the bottom, requires an extra manufacturing step to make the jig, and is awkward for the fisherman to place or remove sinkers from the jig.

Thus, it is object of the invention to overcome these drawbacks of the prior art devices and to provide an improved jig for trolling or drift fishing of bottom feeding fish species, such as walleyes.

SUMMARY OF THE INVENTION

The present invention provides a fishing jig comprising a length of metal rod or wire, bent so as to form a loop and two depending legs of unequal length, the shorter leg of which is provided with a wound eye. The longer of the two legs extends substantially linearly from the loop to its distal end when inserted into the eye. In one embodiment of the invention, a snap swivel is secured to the loop for facilitating attachment of conventional leaders. In an alternative embodiment, a trailing arm is attached to the jig in the proximity of the loop.

DETAILED DESCRIPTION OF THE PREFERRED EMBODIMENTS

The invention will be more fully understood with reference to the following description in connection with the aforementioned drawings. However, it is to be expressly understood that the following description is by way of illustration only and not by way of limitation.

Figures 1, 3:
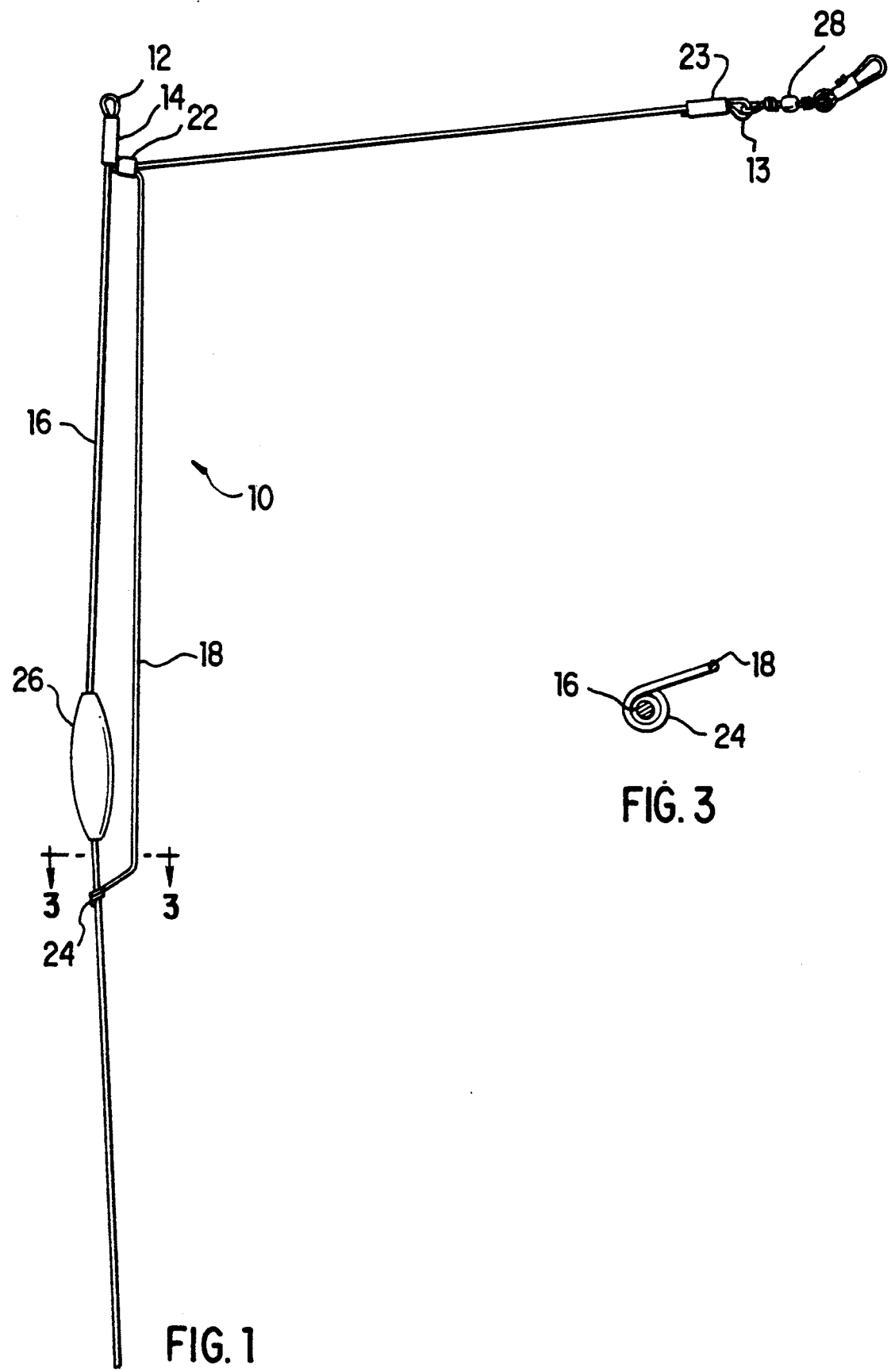
FIG. 1 is a schematic representation of a bottom fishing jig according to one embodiment of the invention wherein an integral trailing arm is provided for attachment of a lure or leader.
FIG. 3 is a partial sectional view taken along lines 3—3 of FIG. 1 illustrating the passage of one leg of the jig through an eye formed at the end of another leg of the jig.

In FIG. 1, there is illustrated a bottom fishing jig 10 according to one embodiment of the invention. Jig 10 is formed of a metallic material, such as a spring steel which can be fabricated by conventional techniques known to the art, such as bending.

In fabricating jig 10, the metallic material in the form of a length of steel rod or wire, is bent into a loop 12 for providing a means for attachment to a conventional fishing line (not shown) forming two depending legs 16, 18 of unequal length. A sleeve 14 is placed over depending legs 16, 18 and slid upwardly toward loop 12. A trailing arm 20, fabricated from a similar steel rod or wire as used for loop 12 and depending legs 16, 18, can be placed within sleeve 14 prior to crimping or soldering of sleeve 14 to secure legs 16, 18 and trailing arm 20. A secondary sleeve 22 can be used to further secure trailing arm 20 to depending leg 18. Alternatively, trailing arm 20 can be fabricated with a loop or wound eye and slipped over one of the depending legs 16, 18 for placement in proximity of loop 12 before closing of loop 12. Depending leg 18 which, as illustrated, is shorter than leg 16, is bent sufficiently so as to assume a bowed configuration for sufficient clearance of conventional sinkers 26. The end of leg 18 is formed into a wound wire loop, or eye 24, so as to capture leg 16 therein, although other equivalent capturing means to positively secure leg 16, such as a soldered sleeve (not shown), can be substituted for wire loop 24 without departing from the spirit of the invention. In a particularly preferred embodiment, the eye is formed of not less than two complete turns of leg 18 in order to securely capture leg 16 therein. The positioning of leg 16 within eye 24 of leg 18 is illustrated in the enlargement of a partial sectional view along line 3—3 of FIG. 1 and shown in FIG. 3.

Conventional weights or sinkers 26, having an aperture therein, can be readily attached to jig 10 by removing leg 16 from wire loop 24 and inserting leg 16 into the aperture (not shown) in sinker 26. As many weights or sinkers as desired can be placed on leg 16 before reinserting leg 16 into wire loop 24. Thus, the invention provides for ease of manufacture of the jig as well as providing a reliable sinker retaining device for holding one or several conventional sinkers or weights in a reliable fashion. No specialized sinkers are required, thereby reducing the expense associated with use of the jig of the invention.

If desired, arm 20 may be provided with a snap swivel 28 for attaching a lure or leader to jig 10. A loop 13 and sleeve 23 of similar construction to loop 12 and sleeve 22 may be utilized to secure snap swivel 28 to jig 10. It is also within the scope of the invention to omit snap swivel 28 entirely, or to substitute other lure or leader attaching means for snap swivel 28 without departing from the scope of the invention.

Figure 2:
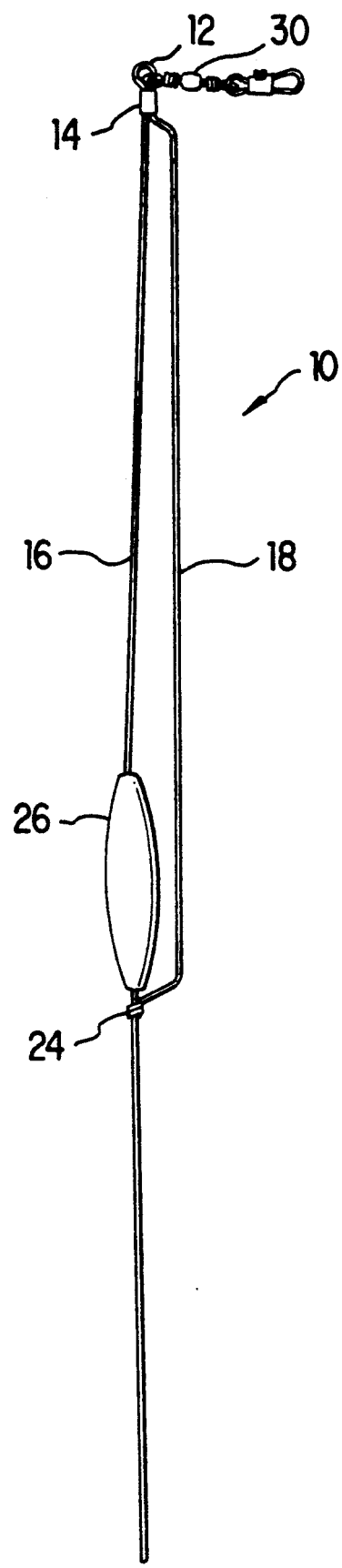
FIG. 2 is a schematic representation of a bottom fishing jig according to an alternate embodiment of the invention wherein a swivel is provided for use in attaching conventional leaders.

In the alternative embodiment of FIG. 2, wherein like elements are designated by like numbers, the trailing arm 20 is omitted, and a snap swivel 30 may be directly attached to loop 12. Snap swivel 30 may be provided for facilitating attachment of a line or leader to jig 10 although snap swivel 30 may be omitted or substituted by other equivalent line or leader attachment means.

Although the metallic material in the form of a length of steel rod or wire can be selected from conventional stock materials, it has been found that a rust resistant spring steel is preferable, having a diameter of from about 0.035 to about 0.041 inches. Depending leg 16 is approximately eleven inches in overall length with shorter leg 18 extending approximately six inches from loop 12 to eye 24. Such a configuration permits removal/reinstallation of sinker 26 on leg 16 by grasping short leg 18 close to the wound loop or eye 24 with one hand and pulling the longer leg 18 back through the loose fitting wound loop or eye 24. Such action releases leg 16 from eye 24 and permits removal/reinstallation of one or more conventional sinkers on long leg 16. By reversing the procedure, leg 16 can be reinserted into eye 24 to secure weight 26 on jig 10.

The present invention facilitates rapid changing of the required weights/sinkers to assure that the jig will be carried to the bottom while at the same time depending leg 16 maintains the presence of the lure or bait at the desired distance from the bottom. Inadvertent loss of sinkers is avoided because eye 24 securely captures the sinker carrying leg 16.

Thus, since the invention disclosed herein may be embodied in other specific forms without departing from the spirit of the general characteristics thereof, some of which forms have been illustrated, the embodiments described herein are to be considered illustrative and not restrictive, the scope of the invention is indicated by the appended claims, rather than by the foregoing description and all changes which come within the meaning and range of equivalency of the claims are intended to be embraced therein.

I claim:

1. A fishing jig for trolling or bottom fishing comprising:
    a continuous metal wire bent into a configuration of two depending legs of unequal length and a loop formed at the juncture of said legs,
    a trailing arm,
    a sleeve proximate said loop and surrounding said two depending legs and one end of said trailing arm,
    the shorter of said two legs being provided with a wound eye,
    the longer of said two legs being substantially linear from said loop to a distal end thereof and being captured by said wound eye of said shorter leg,
    the other end of said trailing arm being provided with a loop.

2. The jig of claim 1 wherein the loop at the other end of said trailing arm being provided with a snap swivel.

* * * * *